US012480888B2

(12) United States Patent
He et al.

(10) Patent No.: US 12,480,888 B2
(45) Date of Patent: Nov. 25, 2025

(54) MACRO PLASTIC AND MICRO PLASTIC DETECTION METHOD BASED ON RGB AND HYPERSPECTRAL IMAGE FUSION

(71) Applicant: TONGJI UNIVERSITY, Shanghai (CN)

(72) Inventors: Pinjing He, Shanghai (CN); Zhan Yang, Shanghai (CN); Hua Zhang, Shanghai (CN); Fan Lyu, Shanghai (CN); Wei Peng, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 236 days.

(21) Appl. No.: 18/530,180

(22) Filed: Dec. 5, 2023

(65) Prior Publication Data

US 2024/0125712 A1  Apr. 18, 2024

Related U.S. Application Data

(63) Continuation of application No. PCT/CN2022/144057, filed on Dec. 30, 2022.

(30) Foreign Application Priority Data

Sep. 27, 2022  (CN) .......................... 202211181644.6

(51) Int. Cl.
*G01N 21/94* (2006.01)
*G01N 1/28* (2006.01)
(Continued)

(52) U.S. Cl.
CPC .............. *G01N 21/94* (2013.01); *G01N 1/42* (2013.01); *G01N 21/27* (2013.01); *G01N 33/442* (2013.01);
(Continued)

(58) Field of Classification Search
CPC ...... G01N 21/94; G01N 21/27; G01N 33/442; G01N 2021/1765; G01N 2021/8874;
(Continued)

(56) References Cited

U.S. PATENT DOCUMENTS

| 2022/0136980 A1* | 5/2022 | Valsesia ................. G01N 21/65 356/237.3 |
| 2022/0161298 A1 | 5/2022 | Kumar et al. |
| 2022/0252728 A1* | 8/2022 | Dokken ................. G01C 13/00 |

FOREIGN PATENT DOCUMENTS

| CN | 108489910 | 9/2018 |
| CN | 108489910 A * | 9/2018 ........... G01N 21/359 |

(Continued)

OTHER PUBLICATIONS

"International Search Report (Form PCT/ISA/210) of PCT/CN2022/144057," mailed on Jun. 20, 2023, pp. 1-5.
(Continued)

*Primary Examiner* — Jennifer D Bennett
(74) *Attorney, Agent, or Firm* — JCIPRNET

(57) ABSTRACT

The present invention relates to a macro plastic and micro plastic detection method based on RGB and hyperspectral image fusion, which includes the following steps: obtaining macro plastics and micro plastics; mixing with solid wastes to obtain a solid-phase substrate; pretreating the obtained solid-phase substrate to obtain a material; drying to remove part of moisture and coating on a quartz window sheet, drying until the moisture is completely removed, and flattening by using another quartz window sheet to obtain a material to be detected; obtaining an RGB image and a hyperspectral image of the material to be detected respectively by using a high-resolution color image scanner and a hyperspectral camera; fusing the obtained RGB image and hyperspectral image; and automatically classifying and
(Continued)

identifying the macro plastics and the micro plastics by using a supervised classification model.

10 Claims, 2 Drawing Sheets

(51) Int. Cl.
*G01N 1/42* (2006.01)
*G01N 21/17* (2006.01)
*G01N 21/27* (2006.01)
*G01N 21/88* (2006.01)
*G01N 33/44* (2006.01)
*G06V 10/80* (2022.01)

(52) U.S. Cl.
CPC ........... *G06V 10/80* (2022.01); *G01N 1/2813* (2013.01); *G01N 2021/1765* (2013.01); *G01N 2021/8874* (2013.01); *G01N 2021/8887* (2013.01); *G01N 2021/945* (2013.01)

(58) Field of Classification Search
CPC ..... G01N 2021/8887; G01N 2021/945; G01N 1/2813; G01N 1/42; G06V 10/80
See application file for complete search history.

(56) References Cited

FOREIGN PATENT DOCUMENTS

| | | | | | |
|---|---|---|---|---|---|
| CN | 109766909 | A | * | 5/2019 | |
| CN | 110390658 | | | 10/2019 | |
| CN | 113902622 | | | 1/2022 | |
| CN | 114112945 | A | * | 3/2022 | ............. G01N 21/27 |
| CN | 114170668 | | | 3/2022 | |
| CN | 114577770 | A | * | 6/2022 | ......... G01N 21/3577 |
| CN | 114674803 | A | * | 6/2022 | ............. G01N 21/65 |
| CN | 114757831 | | | 7/2022 | |
| CN | 114972022 | | | 8/2022 | |
| CN | 115479906 | | | 12/2022 | |

OTHER PUBLICATIONS

"Written Opinion of the International Searching Authority (Form PCT/ISA/237) of PCT/CN2022/144057," mailed on Jun. 20, 2023, pp. 1-4.

Junbo Zhao, "Detection of Environmental Microplastics Based on Hyperspectral Imaging Technology, " Dalian University of Technology, Master's Thesis in Environmental Engineering, Jun. 2019.

* cited by examiner

MACRO PLASTIC AND MICRO PLASTIC DETECTION METHOD BASED ON RGB AND HYPERSPECTRAL IMAGE FUSION

CROSS-REFERENCE TO RELATED APPLICATION

This application is a continuation of international application of PCT application serial no. PCT/CN2022/144057, filed on Dec. 30, 2022 which claims the priority benefit of China application no. 202211181644.6, filed on Sep. 27, 2022. The entirety of each of the above mentioned patent applications is hereby incorporated by reference herein and made a part of this specification.

TECHNICAL FIELD

The present invention relates to the field of micro plastic detection methodology and, in particular, to a macro plastic and micro plastic detection method based on RGB and hyperspectral image fusion.

RELATED ART

Micro plastics are plastic fragments with a size less than 5 mm. As a kind of emerging contaminants, they are widely distributed in lakes, oceans and other natural water systems. The abundance of terrestrial micro plastics is 4 to 23 times that of marine micro plastics, and terrestrial micro plastics are the main source of micro plastics in aquatic environments, so it is crucial to block the release of terrestrial micro plastics from the source. There are a large number of plastic wastes in solid wastes. The micro plastics and plastic fragments with a size of 5 mm or more (hereinafter referred to as macro plastics) generated after disposal are enriched in the products. With the subsequent resource utilization of the products, macro plastics and micro plastics can escape and accumulate in the soil environment, causing potential safety risks.

At present, there are two main detection methods for macro plastics and micro plastics in a solid-phase substrate. (1) Referring to the detection technology for micro plastics in soil: digesting and floating solid waste samples to separate micro plastics and identify macro plastics and micro plastics by vibration spectrum. (2) Referring to the detection method of impurity content in the quality standards of organic waste resource processing products in Germany, the United Kingdom and Austria, manually selecting macro plastics and micro plastics in solid wastes after gradient screening. The above methods take a long time, and have extremely low throughput and a high error rate, and due to the heterogeneity of solid wastes, the detection of small sample sizes results in an extremely high coefficient of variation. This patent will develop a high-throughput detection method for macro plastics and micro plastics based on the characteristics of large differences in organic contents of solid wastes, complex types of inorganic impurities, and wide size ranges of macro plastics and micro plastics (from centimeter-scale to micron-scale).

The hyperspectral image has high spectral resolution, which can effectively identify the chemical composition of the target, but due to the low spatial resolution of the hyperspectral camera, it is difficult to obtain the shape and texture details of the target, which leads to the hyperspectral image being unable to identify small or fibrous micro plastics. The RGB image is a three-primary light image, which has only three channels, but has high spatial resolution, and can obtain clear morphological features of micro plastics. Patent CN 108489910 A discloses a rapid detection method for micro plastics in oysters based on hyperspectral technology, and the steps are as follows: (1) quickly separating micro plastics from oyster tissue and other internal impurities by using visible near-infrared spectroscopy technology; (2) identifying different types of micro plastics in oysters by using spectral technology combined with support vector machine and other supervised classification methods; and (3) visualizing the spatial distribution of micro plastics in oysters by combining hyperspectral image technology and spectral technology. However, this method only uses a hyperspectral camera to detect micro plastics, and the classification accuracy and the identification size range for various micro plastics is small.

In conclusion, it is urgent to provide a detection method for macro plastics and micro plastics to improve the classification accuracy and broaden the identification size range for various micro plastics.

SUMMARY OF INVENTION

The purpose of the present invention is to provide a macro plastic and micro plastic detection method based on RGB and hyperspectral image fusion in order to overcome the defects of the prior art. The hyperspectral image and RGB image are re-sampled by using the image fusion technology, so that the generated image has both high spatial resolution and multi-spectral characteristics. By using the fused results to train a supervised classification model, high-throughput detection of macro plastics and micro plastics in a solid-phase substrate is achieved, which can effectively improve the classification accuracy and broaden the recognition size range for various micro plastics.

The purpose of the present invention can be achieved through the following technical solutions.

The purpose of the present invention is to provide a macro plastic and micro plastic detection method based on RGB and hyperspectral image fusion, including the following steps:

S1: freezing and crushing plastic raw materials in liquid nitrogen before gradient screening, cutting into micro plastics and macro plastics with a size of 100 μm to 50 mm, and mixing and adding into solid wastes to obtain a solid-phase substrate;

S2: pretreating the solid-phase substrate obtained in the S1 to obtain a material, based on an agglomeration degree and grading of the solid wastes in the S1;

S3: drying the material obtained in the S2 to a moisture content of 60 to 75 wt % and coating on a quartz window sheet, further drying until moisture is completely removed to obtain a dried material, and flattening the obtained dried material by using another quartz window sheet to obtain a material to be detected with a thickness of 0.5 to 1.5 mm;

S41: flipping a combination carrying the obtained material to be detected and the two quartz window sheets in the S3, capturing an RGB image of the obtained material to be detected in the S3 by using a high-resolution color image scanner, wherein an "advanced mode" is selected, resolution and a color bit are set, and an optical density value is adjusted to obtain the RGB image with a high-resolution;

S42: capturing a hyperspectral image of the obtained material to be detected in the S3 by using a hyperspectral camera, wherein an object distance, exposure time, a frame number range, and light source intensity are adjusted to obtain the hyperspectral image with a highest clarity;

S5: adding a layer coordinate to the RGB image obtained in the S41 to obtain a reference RGB image, using it as a reference image for image registration, selecting 7 to 15 constraint points in the obtained reference RGB image and the hyperspectral image obtained in the S42, respectively, using a cubic convolution interpolation method to generate a registered hyperspectral image, and selecting a Gram-schmidt method to fuse the obtained reference RGB image and the obtained registered hyperspectral image to obtain a fused image; and S6: selecting regions of interest of the macro plastics and micro plastics in the S1 and the solid-phase substrate in the S1 on the fused image obtained in the S5, obtaining standardized spectral curves of various regions of interest as training datasets, identifying the macro plastics and micro plastics by using a supervised classification method, calculating accuracy, a recall rate, and an F1 score, and calculating a detection rate according to a dosage and detection result.

Furthermore, the solid wastes in the S1 include fine-graded low-agglomerated materials, coarse-graded high-agglomerated materials, and coarse-graded low-agglomerated materials.

Furthermore, the fine-graded low-agglomerated materials include dried sewage plant sludges or digestates from anerobic digesters.

Furthermore, the coarse-graded high-agglomerated materials include biogenic wastes, other wastes, or compost.

Furthermore, the coarse-graded low-agglomerated materials include landfilling samples, bottom ash from municipal solid waste incinerators, or soil contaminated with agricultural films.

Further preferably, the pretreating in the S2 includes the following steps:

in response to the solid wastes in the S1 being the fine-graded low-agglomerated materials, comprising: adding a dispersion solution and then performing ultrasonic treatment; in response to the solid wastes in the S1 being the coarse-graded high-agglomerated materials, comprising: adding a digestion agent, adding a dispersion solution after reacting at 45° C. for 12 hours, and then performing ultrasonic treatment; and in response to the solid wastes in the S1 being the coarse-graded low-agglomerated materials, comprising: after the solid wastes pass through a sieve mesh with a pore size of 2 mm, mixing sieved-out materials with a dispersion solution and performing ultrasonic treatment, mixing remaining sieved materials with a digestion agent after sorting out centimeter-scale crushed plastics from sieved materials, adding a dispersion solution after reacting at 45° C. for 12 hours, and then performing ultrasonic treatment.

Further preferably, the digestion agent is a mixed solution of hydrogen peroxide and ammonia water, wherein a concentration of hydrogen peroxide is 125 g/L and a concentration of ammonia water is 105 g/L.

Further preferably, the dispersion solution is an ethanol solution with a volume fraction of 65 to 75%.

Furthermore, the plastic raw materials in the S1 include one or more of polyethylene, polypropylene, polyvinyl chloride, polystyrene, polyethylene glycol terephthalate, polyamide, and poly(butylene adipate-co-terephthalate) (PBAT) resin.

Furthermore, shapes of the macro plastics and micro plastics in the S1 include one or more of blocky, membranous, fibrous, and spherical shapes.

Furthermore, the resolution is 1200 dpi, the color bit is 24 bit, and the optical density value is 3.8 in the S41.

In the S41, the reason for the flipping a combination carrying the obtained material to be detected and the two quartz window sheets in the S3 is that the high-resolution color image scanner places the quartz window sheets on a scanning plate and shoots from bottom to top (scanning), while the hyperspectral camera places items on a platform and shoots from top to bottom, and to ensure subsequent registration, the quartz window sheets need to be flipped.

Furthermore, the object distance is 15 to 20 cm, the exposure time is 2.2 to 3.8 ms, the frame number range is 40 to 70 Hz, and the light source intensity is 2000 to 2500 lux in the S42.

Furthermore, the supervised classification method in the S6 comprises support vector machine and random forest.

Furthermore, the macro plastics are plastic fragments with a size of 5 mm or more; and the micro plastics are plastic fragments with a size of less than 5 mm.

Furthermore, the RGB image in the step S41 is not limited to RGB images, but also includes high-resolution images containing target texture details such as panchromatic spectrograms, and gray-scale images captured by industrial CCD (charge coupled device) cameras.

Compared with the prior art, the present invention has the following advantages.

(1) The method provided by the present invention does not require separation steps such as density flotation, and can reduce loss of the micro plastics in the pretreatment process.

(2) The method provided by the present invention can detect the macro plastics and micro plastics in the solid-phase substrate in situ with low damage.

(3) The method provided by the present invention has short detection time, can synchronously obtain the morphological information and spectral information of macro plastics and micro plastics, and can realize large-sample-size high-throughput analysis.

(4) The method provided by the present invention has higher classification accuracy and a wider range of recognizable sizes compared to image classification methods obtained by a single detector.

DESCRIPTION OF EMBODIMENTS

Figure 1:
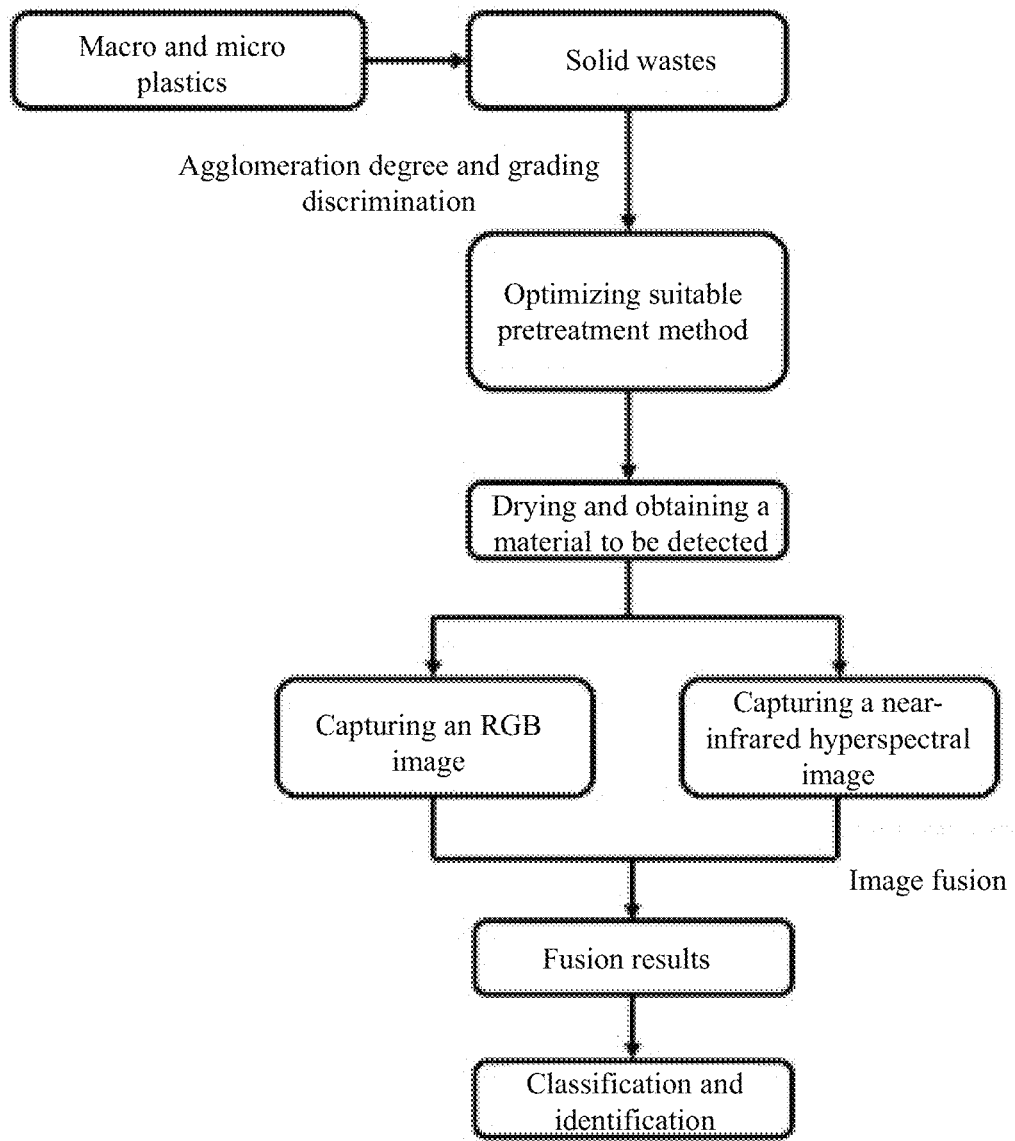
FIG. 1 is a flow chart of a macro plastic and micro plastic detection method based on RGB and hyperspectral image fusion provided by the present invention.

The present invention is described in detail below with reference to the accompanying drawings and specific embodiments. The following particular examples will be conducive to further understanding by those skilled in the art on the present invention, but is not intended to limit the present invention in any forms. It should be pointed out that for those of ordinary skill in the art, the present invention can be transformed and modified in many ways without departing from the spirit of the present invention. All of these fall within the scope of protection of the present invention.

Any features such as preparation methods, materials, structures, or composition ratios not explicitly stated in these technical solutions are considered common technical features disclosed in the prior art.

It is essential to point out herein that the following embodiments are merely intended to further illustrate the present invention and are not construed as limitation to the scope of protection of the present invention, and that some non-essential modifications and adaptations made by those skilled in the art according to the above content of the present invention still fall within the scope of protection of the present invention.

Additionally, unless otherwise specified, all raw materials used are commercially available.

The details of the preferred implementation methods of the present invention and the included embodiments can make it easier to understand the content of the present invention. Unless otherwise limited, all technical and scientific terms used herein have the same meanings as those commonly understood by those of ordinary skill in the art to which the present invention belongs. When there is a conflict, the definition in this specification shall prevail.

As used herein, the terms "prepared by" and "comprising" are synonymous. The terms "comprising", "including", "having", "containing" or any other variations thereof used herein are intended to cover non-exclusive inclusion. For example, compositions, steps, methods, articles, or devices that include the listed elements do not need to be limited to those elements, but can include other elements that are not explicitly listed or inherent in such compositions, steps, methods, articles, or devices.

When quantities, concentrations, or other values or parameters are expressed in terms of ranges, preferred ranges, or ranges defined by a series of upper and lower preferred values, it should be understood that all ranges formed by any matching of any upper range or preferred value with any lower range or preferred value are specifically disclosed, regardless of whether the range is separately disclosed. For example, when a range "1 to 5" is disclosed, the described scope should be interpreted as including ranges "1 to 4", "1 to 3", "1 to 2", "1 to 2 and 4 to 5", "1 to 3 and 5", etc. When the numerical range is described in this article, unless otherwise specified, it is intended to include its end value and all integers and fractions within that range.

The approximate terms in the specification and claims are used to modify quantities, indicating that the present invention is not limited to the specific quantities, but also includes acceptable modifications that are close to the quantities without causing changes in relevant basic functions. Correspondingly, modifying a numerical value with "approximately", "about", etc. means that the present invention is not limited to the exact numerical value. In some examples, approximate terms may correspond to the accuracy of the instrument measuring numerical values. In the specification and claims of this application, range restrictions may be combined and/or interchanged, and unless otherwise stated, these ranges include all sub-scopes contained within them.

In addition, the indefinite articles "a" and "an" before the elements or components of the present invention have unlimited requirements for the number of elements or components (i.e. occurrence number). Therefore, "a" or "an" should be interpreted as including one or at least one, and elements or components in a singular form also include those in a plural form, unless the quantity clearly refers only to the singular form.

"Polymer" refers to a polymeric compound prepared by polymerizing the same or different types of monomers. The general term "polymer" includes the terms "homopolymer", "copolymer", "terpolymer", and "copolymer".

Embodiment 1

As shown in FIG. 1, the macro plastic and micro plastic detection method based on RGB and hyperspectral image fusion in this embodiment includes the following steps:

S1: taking polypropylene, polyethylene, polyethylene glycol terephthalate, polyvinyl chloride, polystyrene and poly(butylene adipate-co-terephthalate) (PBAT) (all purchased from Meryer) as plastic raw materials, freezing and crushing the plastic raw materials in liquid nitrogen before gradient screening to obtain micro plastics and macro plastics with a size of 100 to 250 μm. 250 to 500 μm. 250 to 500 μm, 500 to 1000 μm, 1 to 2 mm, 2 to 5 mm, and 5 to 50 mm, selecting and mixing 3 macro plastics and micro plastics for each size level, and adding into digestates to obtain a solid-phase substrate;

S2: adding a dispersion solution of a 65% (by a volume fraction of ethanol) ethanol solution to the solid-phase substrate in the S1, and then performing ultrasonic treatment at 340 W for 10 minutes to obtain a material;

S3: pouring the material obtained in the S2 into a culture dish at 45° C. and drying to a moisture content of 60 wt %, then coating on the quartz window, further drying until moisture is completely removed to obtain a dried material, and flattening the obtained dried material by using another quartz window sheet to obtain a material to be detected with a thickness of 1 mm;

S41: flipping the quartz window carrying the obtained material to be detected in the S3, capturing an RGB image of the obtained material to be detected in the S3 by using a high-resolution color image scanner, wherein an "advanced mode" is selected, resolution to 1200 dpi and a color bit to 24 bit are set, and an optical density value is adjusted to 3.8 to obtain a high-resolution RGB image;

S42: capturing a hyperspectral image of the obtained material to be detected in the S3 by using a hyperspectral camera, performing white calibration using a white polytetrafluoroethylene panel, wherein an object distance of 18 cm, exposure time of 2.8 ms, a frame number range of 55 Hz, and light source intensity of 2200 lux are adjusted to obtain the hyperspectral image with a highest clarity;

S5: adding a layer coordinate to the RGB image obtained in the S41 to obtain a reference RGB image, using it as a reference image for image registration, selecting 12 constraint points in the obtained reference RGB image and the hyperspectral image obtained in the S42, respectively, using a cubic convolution interpolation method to generate a registered hyperspectral image, and selecting a Gram-schmidt method to fuse the obtained reference RGB image and the obtained registered hyperspectral image to obtain a fused image; and S6: selecting regions of interest of the macro plastics and micro plastics in the S1 and the solid-phase substrate in the S1 on the fused image obtained in the S5, obtaining standardized spectral curves of various regions of interest, and identifying the macro plastics and micro plastics by using a supervised classification method, with an accuracy of more than 90%, and a recall rate and F1 score of more than 85%. The detection rate is the ratio of the number of identified macro plastics and micro plastics to the number of macro plastics and micro plastics added in the S1. The detection rate of various macro plastics and micro plastics is more than 90%.

Figure 2:
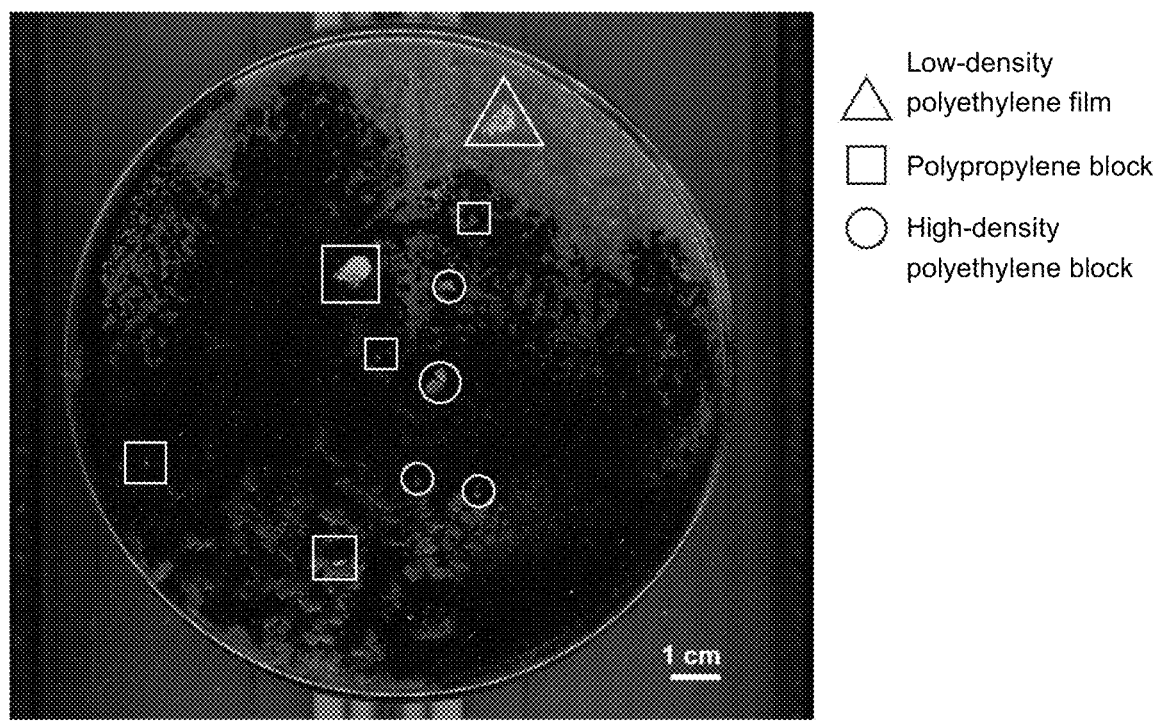
FIG. 2 is a classification result image of macro plastics and micro plastics in Embodiment 1.

The classification results are shown in FIG. 2. The black part is dispersed digestates, and in the white box is the identified micro plastics and macro plastics.

The feasibility of this method was verified using traditional detection methods. Digestion and flotation are used to extract micro plastics from digestates to a filter membrane. Suspected micro plastics particles are detected under a microscopic infrared transmission mode. The ratio of the number of identified macro plastics and micro plastics to the number of added macro plastics and micro plastics is calculated. The detection rate of various macro plastics and micro plastics is 85 to 95%.

The previous examples are only illustrative and are used to explain some features of the method described in the present invention. The attached claims aim to claim a possible widest scope, and the embodiments presented herein are only an explanation of the chosen embodiments based on a combination of all possible embodiments. Therefore, the applicant's intention is that the attached claims are not limited by the selection of examples that illustrate the features of the present invention. Some numerical ranges used in the claims also include sub-ranges within their range, and changes within these ranges should be interpreted as being covered by the attached claims where possible.

The above description of embodiments is for the convenience of those of ordinary skill in the art to understand and use the present invention. Those familiar with the technology in this field can easily make various modifications to these embodiments and apply the general principles explained here to other embodiments without the need for creative labor. Therefore, the present invention is not limited to the aforementioned embodiments. Based on the disclosure of the present invention, any improvements and modifications made by those skilled in the art that do not deviate from the scope of the present invention should be within the scope of protection of the present invention.

What is claimed is:

1. A macro plastic and micro plastic detection method based on RGB and hyperspectral image fusion, wherein the method comprises following steps:
    S1: freezing and crushing plastic raw materials in liquid nitrogen before gradient screening, cutting into micro plastics and macro plastics with a size of 100 μm to 50 mm, and mixing and adding into solid wastes to obtain a solid-phase substrate;
    S2: pretreating the solid-phase substrate obtained in the S1 to obtain a material, based on an agglomeration degree and grading of the solid wastes in the S1;
    S3: drying the material obtained in the S2 to a moisture content of 60 to 75 wt % and coating on a quartz window sheet, further drying until moisture is completely removed to obtain a dried material, and flattening the obtained dried material by using another quartz window sheet to obtain a material to be detected with a thickness of 0.5 to 1.5 mm;
    S41: flipping a combination of the obtained material to be detected and the two quartz window sheets in the S3, capturing an RGB image of the obtained material to be detected in the S3 by using a high-resolution color image scanner, wherein an advanced mode is selected, resolution and a color bit are set, and an optical density value is adjusted to obtain the RGB image with a high-resolution;
    S42: capturing a hyperspectral image of the obtained material to be detected in the S3 by using a hyperspectral camera, wherein an object distance, exposure time, a frame number range, and light source intensity are adjusted to obtain the hyperspectral image with a highest clarity;
    S5: adding a layer coordinate to the RGB image obtained in the S41 to obtain a reference RGB image, using the reference RGB image as a reference image for image registration, selecting 7 to 15 constraint points in the obtained reference RGB image and the hyperspectral image obtained in the S42, respectively, using a cubic convolution interpolation method to generate a registered hyperspectral image, and selecting a Gram-schmidt method to fuse the obtained reference RGB image and the obtained registered hyperspectral image to obtain a fused image; and
    S6: selecting regions of interest of the macro plastics and micro plastics in the S1 and the solid-phase substrate in the S1 on the fused image obtained in the S5, obtaining standardized spectral curves of various regions of interest, identifying the macro plastics and micro plastics by using a supervised classification method, calculating accuracy, a recall rate, and an F1 score, and calculating a detection rate according to a dosage and detection result.

2. The macro plastic and micro plastic detection method based on RGB and hyperspectral image fusion according to claim 1, wherein the solid wastes in the S1 comprise fine-graded low-agglomerated materials, coarse-graded high-agglomerated materials, and coarse-graded low-agglomerated materials;
    the fine-graded low-agglomerated materials comprise dried sewage plant sludges or digestates;
    the coarse-graded high-agglomerated materials comprise biogenic wastes, other wastes, or compost; and
    the coarse-graded low-agglomerated materials comprise landfill piles, bottom ash from municipal solid waste incinerators, or soil contaminated with agricultural films.

3. The macro plastic and micro plastic detection method based on RGB and hyperspectral image fusion according to claim 2, wherein the pretreating in the S2 comprises following steps:
    in response to the solid wastes in the S1 being the fine-graded low-agglomerated materials, comprising: adding a dispersion solution and then performing ultrasonic treatment;
    in response to the solid wastes in the S1 being the coarse-graded high-agglomerated materials, comprising: adding a digestion agent, adding the dispersion solution after reacting at 45° C. for 12 hours, and then performing ultrasonic treatment; and
    in response to the solid wastes in the S1 being the coarse-graded low-agglomerated materials, comprising: after the solid wastes pass through a sieve mesh with a pore size of 2 mm, mixing sieved-out materials with the dispersion solution and performing ultrasonic treatment, mixing remaining sieved materials with the digestion agent after sorting out centimeter-scale crushed plastics from sieved materials, adding the dispersion solution after reacting at 45° C. for 12 hours, and then performing ultrasonic treatment.

4. The macro plastic and micro plastic detection method based on RGB and hyperspectral image fusion according to claim 3, wherein the digestion agent is a mixed solution of hydrogen peroxide and ammonia water, wherein a concentration of hydrogen peroxide is 125 g/L and a concentration of ammonia water is 105 g/L;

the dispersion solution is an ethanol solution with a volume fraction of 65 to 75%.

5. The macro plastic and micro plastic detection method based on RGB and hyperspectral image fusion according to claim 1, wherein the plastic raw materials in the S1 comprise one or more of polyethylene, polypropylene, polyvinyl chloride, polystyrene, polyethylene glycol terephthalate, polyimide, and poly(butylene adipate-co-terephthalate) (PBAT) resin.

6. The macro plastic and micro plastic detection method based on RGB and hyperspectral image fusion according to claim 1, wherein shapes of the macro plastics and micro plastics in the S1 comprise one or more of blocky, membranous, fibrous, and spherical shapes.

7. The macro plastic and micro plastic detection method based on RGB and hyperspectral image fusion according to claim 1, wherein the resolution is 1200 dpi, the color bit is 24 bit, and the optical density value is 3.8 in the S41.

8. The macro plastic and micro plastic detection method based on RGB and hyperspectral image fusion according to claim 1, wherein the object distance is 15 to 20 cm, the exposure time is 2.2 to 3.8 ms, the frame number range is 40 to 70 Hz, and the light source intensity is 2000 to 2500 lux in the S42.

9. The macro plastic and micro plastic detection method based on RGB and hyperspectral image fusion according to claim 1, wherein the supervised classification method in the S6 comprises support vector machine and random forest.

10. The macro plastic and micro plastic detection method based on RGB and hyperspectral image fusion according to claim 1, wherein the macro plastics are plastic fragments with a size of 5 mm or more; and the micro plastics are plastic fragments with a size of less than 5 mm.

* * * * *